United States Patent
Simon et al.

(10) Patent No.: US 8,301,344 B2
(45) Date of Patent: Oct. 30, 2012

(54) DEVICE FOR CLASSIFYING AT LEAST ONE OBJECT IN THE SURROUNDING FIELD OF A VEHICLE

(75) Inventors: Stephan Simon, Sibbesse (DE); Sebastian Lindner, Garbsen (DE); Henning Voelz, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 1194 days.

(21) Appl. No.: 10/566,124

(22) PCT Filed: Jul. 8, 2004

(86) PCT No.: PCT/DE2004/001478
§ 371 (c)(1), (2), (4) Date: Jan. 8, 2009

(87) PCT Pub. No.: WO2005/013235
PCT Pub. Date: Feb. 10, 2005

(65) Prior Publication Data
US 2011/0137527 A1    Jun. 9, 2011

(30) Foreign Application Priority Data
Jul. 25, 2003 (DE) ................... 103 33 987
Aug. 8, 2003 (DE) ................... 103 36 638

(51) Int. Cl.
 G06F 7/00 (2006.01)
 G06F 17/00 (2006.01)
(52) U.S. Cl. ........................ 701/45
(58) Field of Classification Search ........ 701/45, 701/65, 500, 532, 535; 382/159, 165, 170, 382/224, 227; 707/705, 754, 763, 769, 770, 707/771, 790–793, 802–804, 821–831
See application file for complete search history.

(56) References Cited

U.S. PATENT DOCUMENTS

| | | | |
|---|---|---|---|
| 5,410,346 A | 4/1995 | Hanawa et al. | |
| 6,396,535 B1* | 5/2002 | Waters | 348/159 |
| 6,445,409 B1* | 9/2002 | Ito et al. | 348/155 |
| 6,518,916 B1* | 2/2003 | Ashihara et al. | 342/70 |
| 7,102,496 B1* | 9/2006 | Ernst et al. | 340/436 |
| 7,570,793 B2 | 8/2009 | Lages et al. | |
| 2003/0114964 A1 | 6/2003 | Strumolo | |
| 2003/0217880 A1* | 11/2003 | Isogai et al. | 180/170 |
| 2003/0233370 A1* | 12/2003 | Barabas et al. | 707/103 R |

(Continued)

FOREIGN PATENT DOCUMENTS

DE    19518993    12/1996

(Continued)

OTHER PUBLICATIONS

Franke, U. et al., "Real-time stereo vision for urban traffic scene understanding", Intelligent Vehicles Symposium, 2000, IV 2000, Proceedings of the IEEE Dearborn, MI, USA, Oct. 3-5, 2000, pp. 273-278.

(Continued)

Primary Examiner — Mary Cheung
(74) Attorney, Agent, or Firm — Kenyon & Kenyon LLP

(57) ABSTRACT

A device for classifying at least one object in the surrounding field of a vehicle with the aid of an environmental sensor system, the device classifying the at least one object on the basis of its shape and its dimensions, and the environmental sensor system ascertaining the dimensions.

8 Claims, 2 Drawing Sheets

U.S. PATENT DOCUMENTS

| | | | |
|---|---|---|---|
| 2005/0012817 A1* | 1/2005 | Hampapur et al. | 348/143 |
| 2009/0010495 A1* | 1/2009 | Schamp et al. | 382/106 |

FOREIGN PATENT DOCUMENTS

| | | |
|---|---|---|
| DE | 19852631 | 5/2000 |
| DE | 19942223 | 3/2001 |
| DE | 100 25 678 | 12/2001 |
| DE | 10148063 | 4/2003 |
| DE | 10148071 | 4/2003 |
| EP | 1 030 188 | 8/2000 |
| EP | 1030188 A1 * | 8/2000 |
| EP | 1131803 | 9/2001 |
| EP | 1267178 | 12/2002 |
| JP | 8122432 | 5/1996 |
| JP | 2002083297 | 3/2002 |
| WO | WO 98/40825 | 9/1998 |
| WO | WO 02/40320 | 5/2002 |

OTHER PUBLICATIONS

Massad A et al: "Utilizing Temporal Associations for View-based 3-D object Recognition" Industrial Electronic Society, 1998, IECON 98: Proceedings of the 24$^{th}$ Annual Conference of the IEEE Aug. Sep. 1998, pp. 2074-2078.

* cited by examiner

DEVICE FOR CLASSIFYING AT LEAST ONE OBJECT IN THE SURROUNDING FIELD OF A VEHICLE

FIELD OF THE INVENTION

The present invention relates to a device for classifying at least one object in the surrounding field of a vehicle.

BACKGROUND INFORMATION

A camera-based precrash detection system is described in German Patent Application No. DE 100 25 678 A1. In this context, potential opposing parties in an accident are marked in the image data of a monoscopic camera, and their distance and relative velocity are subsequently determined, so that objects specifically putting one at risk can be subjected to classification by type in real time. This method identifies regions within a camera image, in which there are highway users or obstacles. As described above, the identification is carried out with the aid of a classifier specially trained for the highway users and obstacles to detect. The corresponding, identified regions are then marked and measured for their distance from the observer, using a distance-measuring sensor. Finally, the selected regions are supplied to a type-classification unit for exactly determining the type of highway user or obstacle.

SUMMARY

A device according to an example embodiment of the present invention for classifying at least one object in a surrounding field of a vehicle may have the advantage over the related art that the object is classified on the basis of at least its three-dimensional shape and its dimensions. In this context, the environmental sensor system is configured to be able to ascertain the shape and the dimensions. The shape and the dimensions may be important parameters for clearly identifying potential opposing parties in an accident. Protective measures or other vehicle functions may be activated as a function of these parameters. The more effective classification then allows this activation to be carried out more accurately.

It may be particularly advantageous if the device additionally takes the velocity of the at least one object into consideration during the classification. Clear identification may then take place by viewing the shape, dimensions, and velocity of the object as a whole. Then, using data from a data base, a classification validity check as to whether the shapes and dimensions in question, together with the respective velocity, can even characterize a known object, is carried out on the basis of these parameters. In addition, the classification may be carried out by determining the direction of the object, i.e., its orientation. This determines the assessment of the dimensions of the object, for the visible dimensions of the object are determined as a function of the orientation of the object with respect to an observer.

In addition, it may be advantageous if the device is coupled to at least one vehicle system, so that the device controls the at least one vehicle system as a function of the classification. In the case of, e.g., protective measures, such as active operational intervention, such classifications may now be taken into consideration, in order to consider the behavior of such classified objects for the type of intervention.

The vehicle system may advantageously be a protection system, such as ESP, a brake assist system, or an occupant-restraint system, to which, for example, a pedestrian protection system may also belong. However, the vehicle system may also be a driver assistance system, such as a lane-change warning device, when it is determined on the basis of the object classification that a lane-change event is probable.

The environmental sensor system may have a stereoscopic camera for measuring the dimensions and the three-dimensional shape. However, a monoscopic camera having moving stereo is also possible. Further alternatives include LIDAR, scanning radar sensors, or other stereo-capable sensors.

BRIEF DESCRIPTION OF THE DRAWINGS

Exemplary embodiments of the present invention are shown in the figures and are explained in detail below.

DETAILED DESCRIPTION OF EXAMPLE EMBODIMENTS

Figure 1:
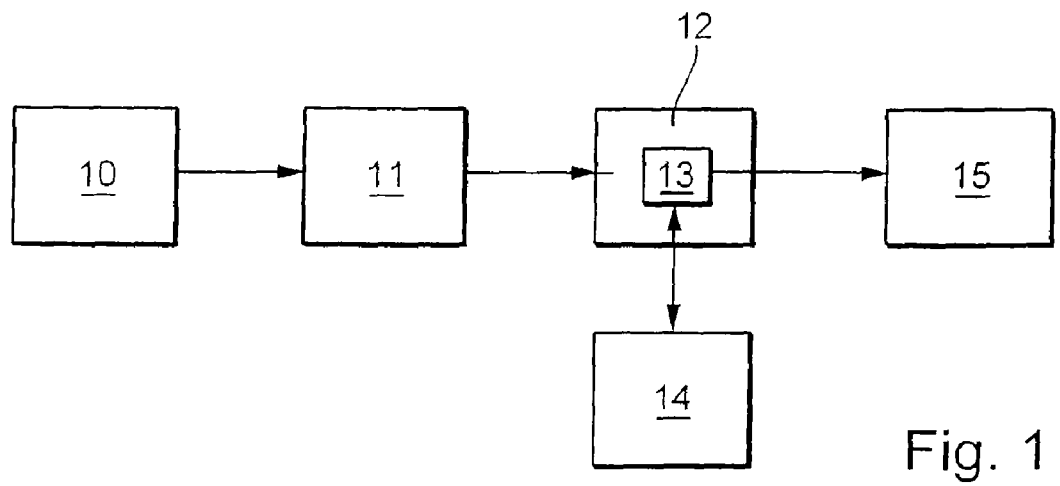
FIG. 1 shows a block diagram of an example device according to the present invention.

Present mass-produced systems for environmental sensing include, for example, parking-assistance systems, which detect the distance to an object with the aid of ultrasonic sensors and emit a warning when the measured distance becomes too small. Also mass-produced is so-called adaptive cruise control (ACC), which determines spacing and velocity with the aid of a radar technology. This allows the functionality of a vehicle-speed controller, which holds the set speed constant, to be expanded. In this manner, a desired safety distance may be additionally maintained while controlling the set speed.

At present, systems for environmental detection are being developed, using sensors such as video, radar, near and far infrared, ultrasonic, or LIDAR sensors, or range-image cameras, as well as a combination of these sensors. With the aid of these systems, objects should be detected with higher reliability than up to this point and new uses should be developed. These include, for example, an object-detection system, in which position measurements, motion measurements, and object measurements are ascertained, or a traffic-lane detection system, in order to allow, for example, a lane-change warning. Such systems are developed for use in safety and luxury applications.

Object classification may also be an important subject. Classification is the dividing-up of the objects into predefined classes. In particular, safety and comfort systems of the vehicle may be improved with the aid of this additional information about the detected objects. In particular, in critical situations such as accident scenarios, safety systems may be used in a more differentiated and effective manner with the aid of object classification.

Possible applications of a classification of objects in the surrounding field of a vehicle include:
Safety Functions:
  protection of vehicle occupants;
  partner protection, that is, the protection of other highway users;
  improvement of the crash compatibility between parties involved in an accident;
  warning functions; and
Comfort Functions:
  expansion of the ACC functionality.

Reliable descriptions of the surrounding field of a vehicle may be necessary for many future safety functions. Interventions in the vehicle control without the activation of restraining devices could be damaging than useful, when they are executed by mistake. In devices such as ACC, data regarding relevant objects are acquired, for example, from radar sensors and are mostly limited to geometric information, such as position and velocity. Further information about the type of object is not available. However, a detailed description of the surrounding field of the vehicle and higher reliability of the information are necessary for eliminating instances of false activation or other shortcomings of present systems. If an object is not only detected, but also the type of object is determined, many different measures become possible:

An important field of application of object classification in the surrounding field of the vehicle is partner protection. For example, when an imminent collision with a pedestrian is detected, a pedestrian airbag at the front of the vehicle is triggered or the engine hood or front opening hood is raised. This cushions the impact of the pedestrian with the vehicle, and impact with the engine block situated directly under the front opening hood is prevented. However, a pedestrian sensory system mostly operates, using contact sensors for detecting impact. In this context, there is a danger of false activation, because such a contact sensor could also cause activation, for example, when the vehicle strikes a delineator.

Such false activation may be prevented with the aid of object classification. This allows repair costs to be reduced, in particular when activating non-reversible restraint systems such as airbags.

The use of object classification also allows such a system to be activated in an anticipatory manner. Early detection of the imminent pedestrian collision allows the airbag to be activated without the necessity of detection by the contact sensor. The decision to activate on the basis of the contact sensor may be made more reliably, using the result of the classification system. Consequently, the robustness of the system may be increased, or contact sensors could even be dispensed with.

In particular, in the case of so-called sport-utility vehicles (SUV's), because of the raised front of the SUV, the danger for smaller vehicles in a collision is considerably higher than when the two front ends are at the same elevation. If an imminent collision between a small car and an SUV equipped with a classification system is detected with the aid of an object classification system, then its front end may be lowered, for example, with the aid of an air suspension. In the event of a collision with another SUV or another vehicle of a similar size class, this lowering would not occur. Thus, with the aid of a classification system, it may be ensured that the greatest possible crash compatibility is always produced. This lessens the severity of the accident. An alternative adaptation of the crash compatibility may only be carried out on the basis of geometric object data, such as the height of the accident participant. However, this would not be reliable enough, since, for example, a bicyclist may have the same height as an SUV. The described measure is only rendered possible by a reliable classification system.

The use of object classification in the monitoring of the surrounding field can be very useful for functions, such as automatic emergency braking or an automatic evasive maneuver. In this connection, it is advantageous to be able to distinguish between objects worth being protected, such as highway users, and objects less worthy of protection, such as delineators or guard rails. If an imminent, unavoidable collision with a pedestrian is detected, then emergency braking should be carried out. If the detected object is, for example, a delineator or a small tree, then the damage produced by emergency braking or an evasive maneuver, e.g. the danger to the following traffic, may be greater than the benefit. In the case of objects not worth protecting, such unintentional activation of the system acting on the vehicle dynamics may only be prevented with the aid of a classification system.

In addition, when calculating an evasive maneuver in view of the knowledge of the object classification, the probable behavior of the object to be avoided may be taken into account. For example, a pedestrian can make a 180° turn more rapidly than a vehicle. However, a pedestrian cannot accelerate as rapidly in a constant direction, which means that knowledge of the object classification is necessary for reliably determining a course of avoidance.

An additional possibility of the classification is to use it for checking the object input data for their validity. Due to measuring errors, it is possible, for example, for the width of a 1.65 m wide vehicle to be measured to be only 1 m, which is too small. There are presently no motor vehicles of this width, which means that the result would therefore be implausible. If the vehicle is nevertheless classified as a small passenger car, then the width can be checked for validity. The classification allows the object width to be corrected to that of the class of small passenger cars. It is possible that systems, such as automatic avoidance, would not execute any actions in the case of an object having a width of 1 m, although it would be necessary. In this example, the desired action would still be initiated on the basis of the classification result.

In this case, the width designates the real value. Since the orientation of the object is known, the width may always be deduced from the measurement. Consequently, one then obtains the actual width of the object.

Warning systems, such as a lane-change warning device, may also be assisted by an object-classification system. In such systems, the lane in which the reference vehicle is situated is detected. If the vehicle leaves this lane, e.g., the vehicle slowly drifts off due to fatigue symptoms of the driver, then a warning is emitted. Such a system may be assisted by an object-classification system. If the roadway-edge markings cannot be clearly detected due to snow, rain, dirt, or deterioration, but delineators or guard rails at the edge of the roadway are classified, then these may be used to assist in estimating the path of the traffic lane.

By evaluating the classification, systems may be adapted to the current situation of the surrounding area. A pedestrian on the street may be an indication that more pedestrians are to be expected. Increased attentiveness is necessary in this situation.

The workload of the vehicle operator may be reduced by comfort functions, so that more relaxed, and therefore safer driving is possible. In the case of an expanded ACC system, the control parameters may be adjusted automatically, using the knowledge of the class of a preceding object. For example, the different acceleration and deceleration capabilities of the preceding vehicle may be taken into account.

Different types of sensors or combinations of many different sensors may be used for monitoring the surrounding area of the vehicle. Objects are detected in the monitored surrounding field and described, for example, by position, shape, dimension, and movement. According to the present invention, the shape and the dimensions of the object may be used as the first parameter for classification. A further refinement then provides for the object velocity to be additionally used for object classification. The distance to the observer determines the quality of the classification: Because of the measuring inaccuracy and the resolution, an object a long distance away may not be classified as effectively as in the case of a short distance. The difference between the width of a small and a large passenger car is only a few dm. The measuring accuracy in the lateral direction at 50 m is approximately in this range. The resolution also plays a role here. If an object is, e.g., only 1 m away, then one image pixel represents, for example, 1×1 cm. If the object is 50 m away, then one pixel represents, e.g. 50×50 cm. The numerical values are selected here for the sake of comprehension.

The object velocity may be directly measured by environmental sensors, such as radar. In other systems, the speed is derived from at least two staggered position determinations. An object data, i.e., the sensor-specific descriptions of the objects, are used as input data for the object-classification system. The object of the classification is to group objects in above-mentioned classes. In the case of monitoring the surrounding field of the vehicle, these classes may include trucks, automobiles, motorcyclists, and pedestrians. For finer degrees, large and small automobiles or other classes such as station wagons, notchback cars, and SUV's are possible. Each class has specific characteristics, which describe the characteristic features of its own class or differences with respect to other classes. Such characteristics may be optionally organized in a database. Characteristics that describe an object may include the dimensions. In a further refinement, the possible speed range is then considered, as well. For example, if an object is moving at a speed of 75 kilometers per hour, then based on this characteristic, it is highly improbable that it is a pedestrian.

FIG. 1 shows an example device according to the present invention in a block diagram. An environmental sensor system 10 transmits environmental sensor data to a signal processor 11, which sends the processed signals to a control unit 12. The control unit has a processor 13, which processes the sensor data and, using a memory that may be a database, classifies objects on the basis of the sensor data. Control unit 12 then transmits the classification result to other vehicle systems, such as vehicle system 15 shown here by way of example, e.g. an occupant-restraint system. The action of vehicle system 15 is determined on the basis of the object classification.

Processor 13 ascertains the shape and the dimensions of the individual objects from the sensor data. In addition, the speed of the individual objects is ascertained from the sensor data. This may then be compared to a speed range. In this case, sensor system 10 is a video sensor system. However, it is also possible for a radar sensor system, e.g., a 77 Gigahertz radar sensor system, to be used. An ultrasonic sensor system is also possible for the short range.

One may ascertain a three-dimensional point cloud of a physical object with the aid of a stereo video sensor. The points in this cloud are then combined (clustered) to form an object in the classification system. Therefore, the point cloud is described by a surrounding box (bounding box), whose dimension corresponds to the dimensions of the physical objects. A further option for determining the dimensions is an analysis of the image. In this case, one may determine the edges of the vehicle and calculate the dimensions with the aid of the orientation (if known).

Figure 2:
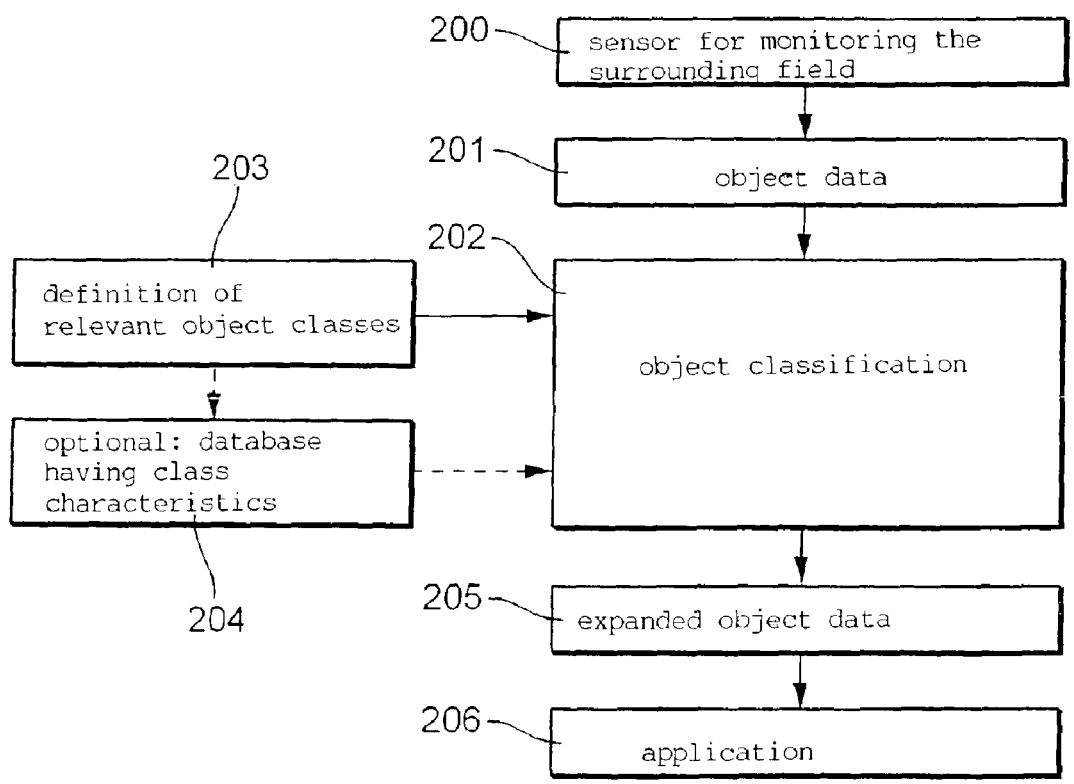
FIG. 2 shows a flowchart.

FIG. 2 shows a flowchart of how an object may be classified. In method step 200, sensor system 10 ascertains the objects in the surrounding field. Evaluating unit 11, which processes the signals for control unit 12, then generates the object data, which are transmitted to control unit 12, and consequently to processor 13. This is accomplished in method step 201. Processor 13 then carries out the object classification in method step 202. For this, it uses predefined, stored definitions of relevant object classes, i.e., on the basis of the shape, dimensions and speeds of the object. In this context, the processor may also access a database 204 in which the class characteristics are stored, in order to carry out unequivocal classifications on the basis of the measuring results.

The classification results are filtered as a function of time. This means that when an object has already been classified ten times as a small passenger car, for example, and should now be classified as either a small passenger car or possibly a pedestrian (same characteristics in this measurement), the object continues to be classified as a small passenger car with the aid of the temporal filtering. There is also a reject class. All objects, which could not be assigned to any class (because they do not correspond to any characteristics of the classes in the model database), are categorized here.

Depending on the application, a non-unique result may also be sufficient. For example, if an object was classified as either a large or a small vehicle and the application is designed for pedestrian protection, then this ambiguity is not relevant.

In method step 205, the object classifications are then supplied to vehicle systems 15. In method step 206, the action of these vehicle systems 15 is then controlled as a function of the object classification.

Figure 3:
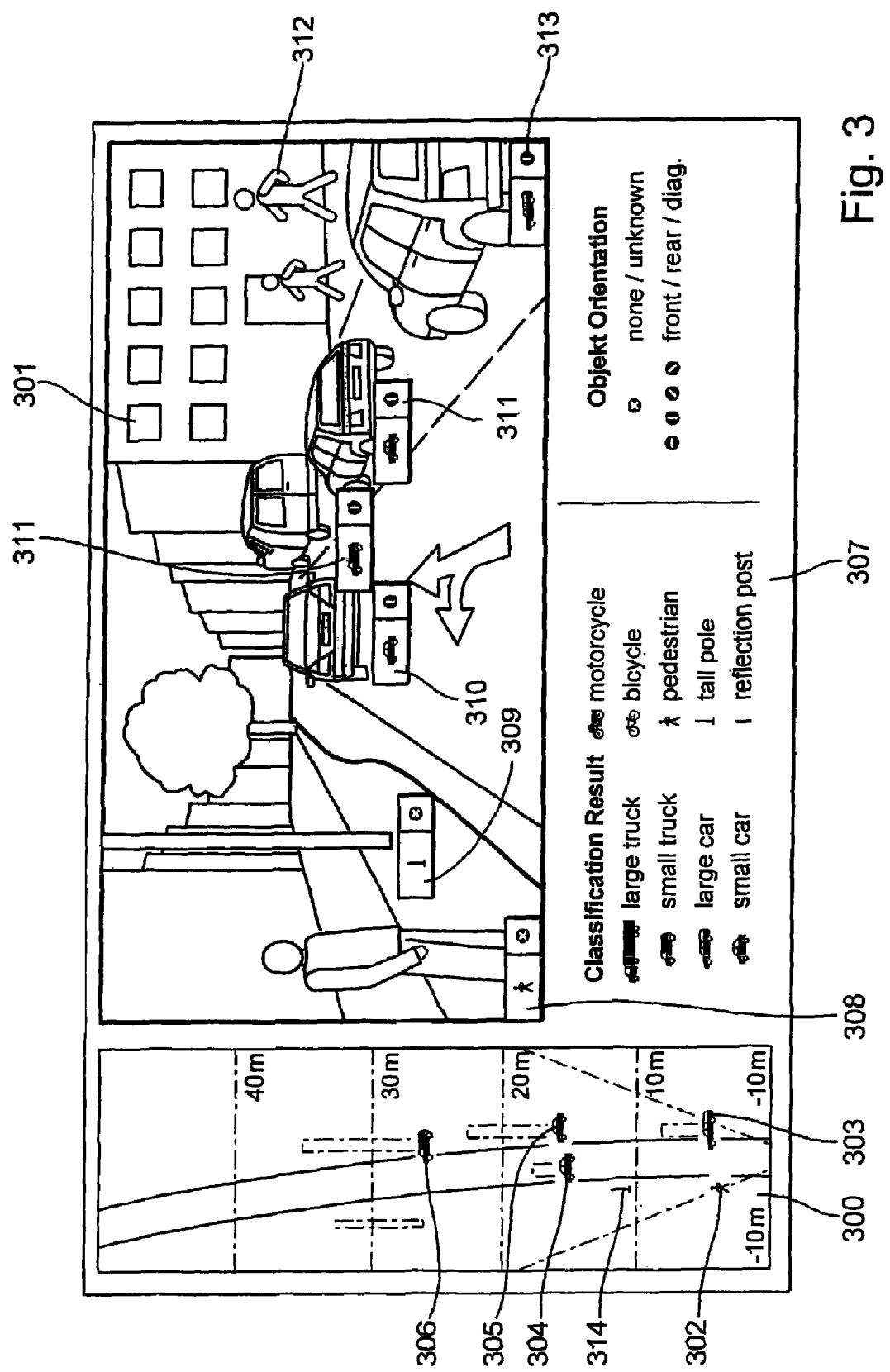
FIG. 3 shows an example of classification.

FIG. 3 shows an example of a classification. Shown in picture 300 is a plan view of a corridor, which is monitored by a vehicle. Here, objects are classified by classifiers that are represented schematically. The objects are then covered by the rectangles and supplied one classifier each. Classifier 302 shows a pedestrian. Classifier 303 shows a large passenger car. Classifier 314 shows the posts of a street lamp. Classifier 304 represents a small passenger car, as does classifier 305 as well, while classifier 306, which is already in an outer monitoring region, represents a small truck. In addition, a delineator, a bicycle, a motorcycle, and a large truck may also be classified, as described in legend 307. Image 301 shows how a video camera in the vehicle monitors and classifies the scene. The pedestrian at the left edge of the image, who is denoted by classifier 308, additionally has an object orientation here, which, according to the legend, indicates that pedestrian 308 does not have an orientation. As is shown here, he or she is standing at the edge of the street, as well. Street lamp 309 also has this symbol indicating that it does not have an object orientation. Classification 310 shows a passenger car, which is traveling in front of the observer and is oriented in the front (forward) direction. Truck 311 next to it is also oriented in the forward direction, as is passenger car 311 and a further passenger car 313, as well. Other objects are not classified here. The object classification is also a function of distance.

What is claimed is:

1. A device for classifying at least one object in a surrounding field of a vehicle, comprising:
    an environmental sensor system; and
    a classifier that classifies the at least one object into one of a plurality of classes including object classes and a reject class, based on a three-dimensional shape of the at least one object and dimensions of the object, the environmental sensor system ascertaining the shape and the dimensions, wherein the classifier performs temporal filtering in classifying the at least one object by taking into consideration a previous classification of the at least one object, and wherein each object class has assigned properties which describe at least one of characteristic features of the class and differences from other classes, the properties of the object classes being stored in a model database, and wherein the at least one object is classified as belonging to the reject class if the at least one object does not correspond to any of the properties of the object classes stored in the model database.

2. The device as recited in claim 1, wherein the classifier is configured to take into account, during the classification, a velocity of the at least one object according to at least one of magnitude and a direction.

3. The device as recited in claim 1, wherein the classifier is configured to take into account, during the classification, an orientation of the at least one object.

4. The device as recited in claim 1, wherein the classifier is configured to check validity of the classification using data from a database.

5. The device as recited in claim 1, wherein the device is coupled to at least one vehicle system in such a manner that the device controls the at least one vehicle system as a function of the classification.

6. The device as recited in claim 5, wherein the vehicle system is a protection system.

7. The device as recited in claim 5, wherein the vehicle system is a driver-assistance system.

8. The device as recited in claim 1, wherein the environmental sensor system includes at least one of a stereoscopic camera, a monoscopic camera having a stereo motion sensor, a LIDAR sensor, and a scanning radar sensor.

* * * * *